(12) United States Patent
Rychlak

(10) Patent No.: US 6,658,116 B1
(45) Date of Patent: Dec. 2, 2003

(54) STEREO RADIO RECEIVER

(75) Inventor: Stefan Rychlak, Ilsede (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/066,470

(22) PCT Filed: Jul. 27, 1996

(86) PCT No.: PCT/DE96/01402

§ 371 (c)(1),
(2), (4) Date: Aug. 12, 1998

(87) PCT Pub. No.: WO97/16891

PCT Pub. Date: May 9, 1997

(30) Foreign Application Priority Data

Oct. 27, 1995 (DE) .......................... 195 40 183

(51) Int. Cl.[7] .............................. H04H 5/00; H04B 1/10; H04B 7/005
(52) U.S. Cl. ........................ 381/11; 381/13; 381/10; 381/1; 381/2; 455/504; 455/296; 455/312
(58) Field of Search ................ 381/10, 11, 13, 381/1–2; 455/504, 296, 312

(56) References Cited

U.S. PATENT DOCUMENTS

| 3,634,626 | A | * | 1/1972 | Staley | 381/11 |
| 3,823,268 | A | * | 7/1974 | Modafferi | 381/10 |
| 4,054,840 | A | * | 10/1977 | Sato | 455/214 |
| 4,860,354 | A | * | 8/1989 | van Roermund | 381/11 |
| 4,977,597 | A | * | 12/1990 | Horl | 381/11 |
| 5,113,446 | A | * | 5/1992 | Kennedy | 381/10 |
| 5,119,420 | A | * | 6/1992 | Kato et al. | 381/1 |
| 5,155,770 | A | * | 10/1992 | Maejima | 381/11 |
| 5,235,646 | A | * | 8/1993 | Wilde et al. | 381/17 |
| 5,432,854 | A | | 7/1995 | Honjo et al. | 381/10 |
| 5,455,866 | A | * | 10/1995 | Ohashi | 381/10 |
| 5,564,093 | A | * | 10/1996 | Matasumoto | 455/266 |
| 5,592,557 | A | * | 1/1997 | Chahabadi et al. | 381/10 |
| 5,671,286 | A | * | 9/1997 | Gottfried et al. | 381/13 |
| 5,673,324 | A | * | 9/1997 | Kasser et al. | 381/13 |
| 5,701,345 | A | * | 12/1997 | Howlett et al. | 381/13 |

FOREIGN PATENT DOCUMENTS

EP 0 030 874 6/1981

* cited by examiner

Primary Examiner—Forester W. Isen
Assistant Examiner—Laura A. Grier
(74) Attorney, Agent, or Firm—Kenyon & Kenyon

(57) ABSTRACT

A stereo radio receiver has a channel separation stage for setting an optimal channel separation of the left audio channel from the right audio channel, even under sufficient receiving field strength following a time of multipath reception for the duration of the operating time of a timing element, to a reduced (i.e., lesser degree of) channel separation.

23 Claims, 2 Drawing Sheets

STEREO RADIO RECEIVER

BACKGROUND INFORMATION

Modern-day stereo transmitters provide, on the transmitter side, for a signal format which emphasizes the base width of the stereo signal and the channel separation in order to enhance the audibility of the three-dimensional sound of a stereo transmission.

This benefit that is associated with the reception of present-day stereo transmitters is lost when the transmitters reach a reception location with only little field strength. This is due to the fact that, in order to have an interference-free channel separation, a minimum field-strength value of the stereo transmitter is required at the receiving location. This is because expensive stereo radio receivers, in particular, car radios, have come equipped for quite some time already with a phased transition from stereo to mono reproduction, which is dependent on the receiving field strength. Therefore, in car radios of this kind, the channel separation is automatically varied in response to a drop in the receiving field strength during travel.

Often, however, besides the fluctuation in the receiving field strength, in order to receive the tuned transmitter, reception areas, which are well serviced by the tuned transmitter, a multi-path reception should be used. An inconvenience that becomes noticeable under such reception conditions is that, even when using the stereo radio receivers described above, with their phased mono-stereo transition tuned to optimal channel separation, one experiences a sudden disruption in the satisfactory stereo reproduction, often only on a short drive into a multi-path reception area. For that reason, for the multi-path reception of the tuned transmitter, stereo radio receivers come equipped with a detector whose output signal controls a changeover switch for switching the receiver to monophonic reproduction.

On travel distances where one encounters brief multipath reception, for example on streets with multi-story buildings or in mountainous regions, the switch is often made between single-path and multi-path reception within one to two seconds, and thus, in a corresponding frequency, between stereo and monophonic reproduction of a stereo transmission. For some time now, drivers have perceived this effect to be so disturbing that, in mountainous regions, they turn off the stereo decoder, when receiving present-day stereo transmitters, and do entirely without the stereo reproduction.

U.S. Pat. No. 5,432,854 describes a conventional FM stereo receiver, which, as a function of reception noises isolated by a high-pass filter from the stereo multiplex signal, including among these multi-path reception as well, generates a control signal for reducing the stereo channel separation of an audio signal to be reproduced, in such a way that in response to a reception noise, it reduces the stereo channel separation and, after expiration of a predefined time period, after the reception noise has decayed, raises it again to its original value.

An arrangement is described in European Patent Application No. 0 030 874 for reducing the influences of reception noises on a reproduced audio signal, in the case of which, from reception noises, a control signal is derived in an analogous manner, with which the band width of the reproduced audio signal is influenced in response to the occurrence of a noise interference.

SUMMARY OF THE INVENTION

These types of disturbances are able to be substantially reduced by using a stereo radio receiver according to the present invention, it being possible, outside of the duration of the actual disturbances, to have an at least partially stereophonic reproduction, even if it is with reduced stereo channel separation.

DETAILED DESCRIPTION OF THE INVENTION

Figure 1:
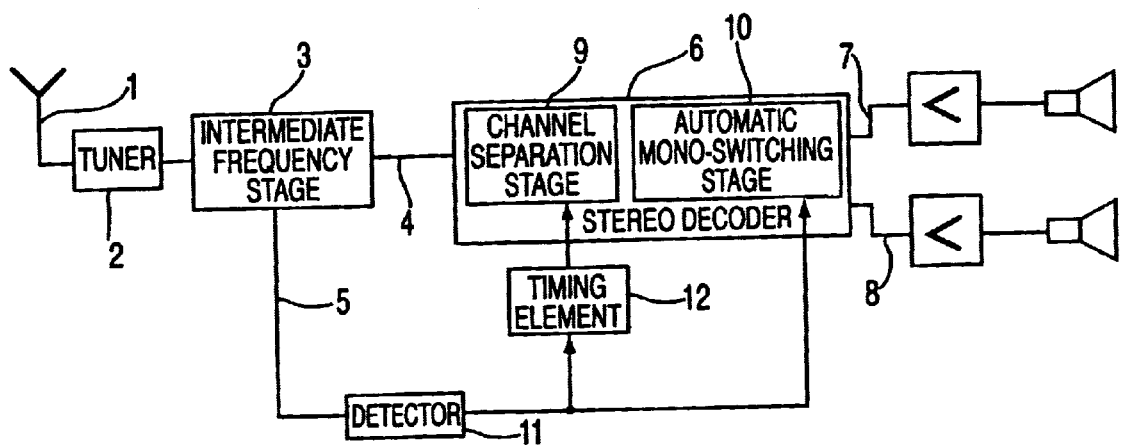
FIG. 1 shows stages of a conventional stereo radio receiver, supplemented by a timing element for controlling a channel-separation stage in a stereo decoder.

Via an antenna 1, the stereo radio receiver shown in FIG. 1 receives a frequency spectrum, within which also lie the stereo transmitters able to be received at the particular moment. A tuner 2 tunes the stereo radio receiver to the frequency of the desired stereo transmitter. The output of tuner 2 is linked to an intermediate frequency stage 3, where the transmitter modulation is translated to the intermediate frequency of the receiver, and then demodulated by the intermediate frequency. At a first output 4 of ZF stage 3, the transmitter modulation, the so-called MPX signal, is adapted to be tapped off. A second output 5 of ZF stage 3 always supplies a signal in response to the carrier frequency of the tuned transmitter reaching antenna 1 over a plurality of paths, thus in response to a so-called multi-path reception.

The two stereo signals contained in the MPX signal are separated in a stereo decoder 6, and fed into associated audio channels 7 and 8. Each audio channel includes an NF amplifier and a loudspeaker for making the particular stereo signal audible.

Stereo decoder 6 includes, among other things, a channel-separation stage (stero-separation) 9 and an automatic (controlled) mono-switching stage 10. The automatic mono-switching stage 10 effects the monophonic reproduction of the actually available stereo signals via both audio channels 7 and 8. It is always operatively switched, then, by a detector 11 when the detector senses a control signal of sufficient magnitude at second output 5 of ZF stage 3, indicating, as described above, a multi-path reception of the carrier frequency of the tuned transmitter.

When working with a multi-path reception of this kind, phase differences exist among the carrier frequencies of the stereo transmitter on the different paths loading to antenna 1, the phase differences degrading, among other things, the separability of the two stereo signals. The automatic mono-switching stage 10 avoids disturbances of this kind produced in the separated channels, which can degrade reproduction quality.

The stereo radio receiver described above is conventional, above all, in car radios, so that there is no need to describe the individual modules in detail.

In addition to automatic mono-switching stage 10 at the output of detector 11, the stereo radio receiver shown in FIG. 1 has a timing element 12, which is linked to a control input of channel-separating stage 9.

Figure 2:
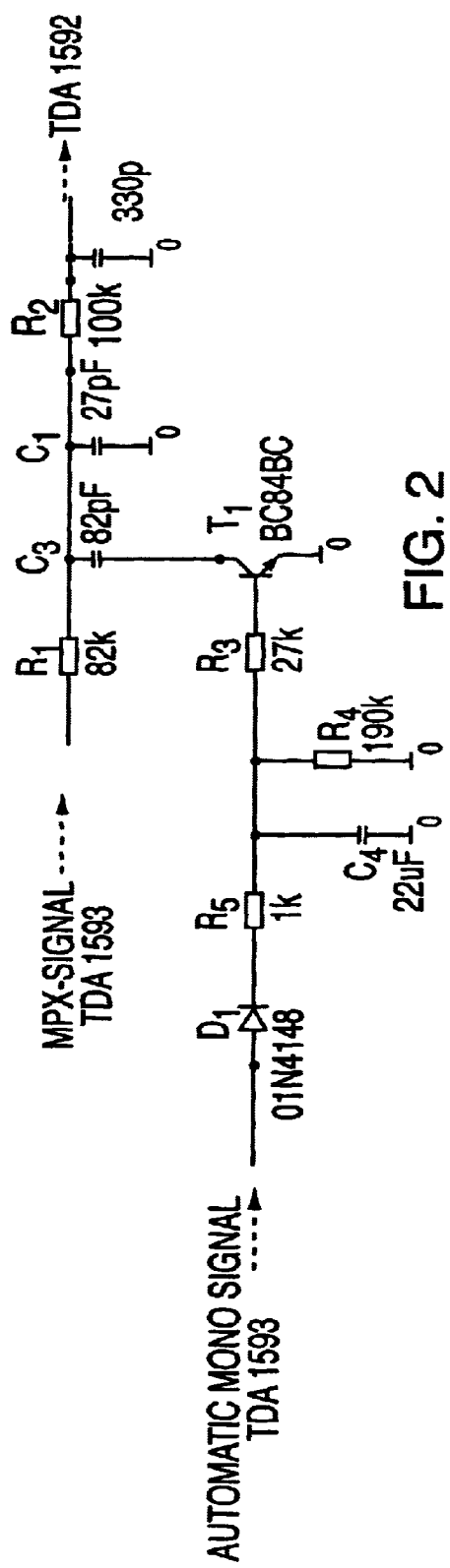
FIG. 2 shows a timing element in conjunction with a phase shifter for a channel separation in a MPX signal path of the stereo decoder.

As shown in FIG. 2, channel-separating stage 9 can be configured as a controllable phase shifter that is linked to MPX output 4 of ZF stage 3.

From conventional methods, it is possible to permanently set phase shifters or to adjust them at the time of manufacturing in the MPX signal path. To effect an optimal channel separation, the phase shifters are set up at the time the circuit is dimensionally designed or adjusted.

To avoid the disturbances described above, in this embodiment of the present invention, the phase shifter is designed to be controllable by a timing element, and is dimensionally designed so that during the operating time of the timing element, the optimal (i.e., optimization of) channel separation is canceled and is retained to a lesser extent.

A phase shifter of this kind includes, for example, a series resistor $R_1$ of 82 kOhm connected to the MPX output of the (ZF-IC) TDA 1593, a capacitor $C_1$ of 27 pF connected to ground, a further series resistor $R_2$ of 100 kOhm, and a second capacitor $C_2$ of 330 pF connected to ground. The output of this phase shifter leads to the MPX input, and to PIN 20 of stereo decoder TDA 1592.

In parallel to capacitor $C_1$, a third capacitor $C_3$ of 82 pF is connected to series resistor $R_1$. The base point of capacitor $C_3$ is connected to the collector of a transistor $T_1$, for example of a BC 848 C, whose emitter is connected to ground.

Included in the basic circuit of transistor $T_1$ is a series resistor $R_3$ of 27 kOhm, which is followed by a cross (shunt) resistor $R_4$ of 190 kOhm, which is connected to ground. Disposed in parallel to resistor $R_4$ is a fourth capacitor $C_4$ of 22 $\mu$F. The high point of capacitor $C_4$ is connected via a series resistor $R_5$ of 1 kOhm to the cathode of a decoupling diode $D_1$, e.g., N4148, which is linked to the output of detector 11.

In response to a critical magnitude of the multi-path reception, a detector signal appears at this output, forcing transistor $T_1$ to open with time constants $R_5/C_4$. As a result, capacitor $C_3$ is switched in parallel to capacitor $C_1$, thereby reducing the optimal (optimization of) channel separation. The specified values are used to set the possible crosstalk acceptable between the channels to 12 dB. In response to a change in the values the extent of which the channel separation is reduced can be varied.

At the same time, however, the automatic mono-switching stage 10 (e.g., via PIN 16 at IC 1592) is energized, so that the reduction in the channel separation does not become noticeable during the multi-path reception itself. If the vehicle equipped with the stereo radio receiver, for example, as a car radio, leaves the multi-path reception area of the tuned transmitter, then the detector signal is fails to appear. This deactivates automatic mono-switching stage 10. At this instant, however, the potential drops again across the anode of diode $D_1$. However, transistor $D_1$ is again switched through further in response to the charging of capacitor $C_5$. At this point, the capacitor is slowly discharged across cross resistor $R_3$ and still keeps transistor $T_1$ open for a certain time span. The length of this time span is defined by the two components $C_4/R_4$, which make up the timing element. When the timing element's operating time elapses, transistor $T_1$ slowly passes over into the blocked state. This causes the channel separation effected by the phase shifter to increase continually to the optimal value.

When, during the operating time of timing element $C_4/R_4$, in which transistor $T_1$ is fully open, the vehicle drives into a new multi-path reception area of the tuned transmitter, then the detector signal appears again and recharges capacitor $C_1$.

Figure 3:
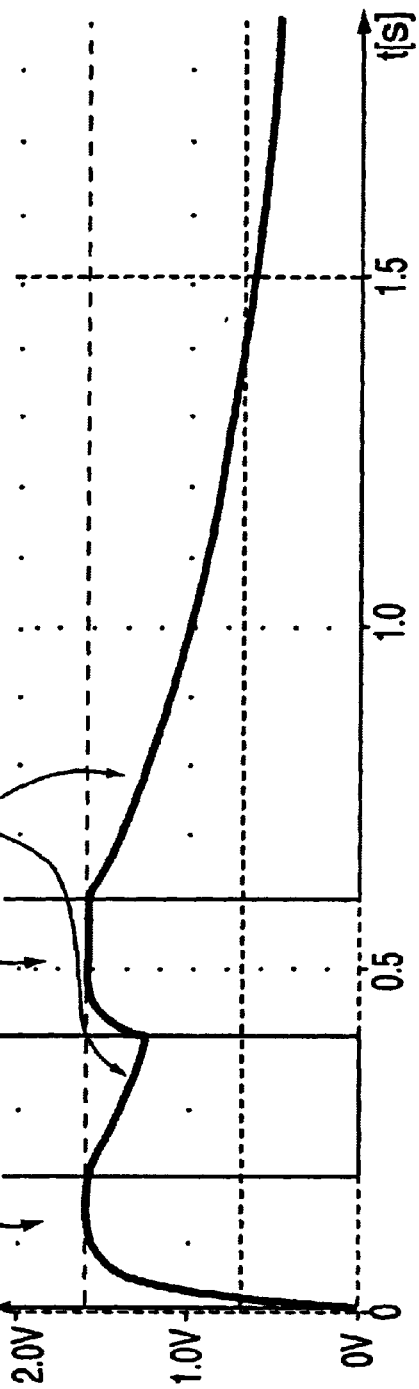
FIG. 3 shows a representation of the charging profile of a capacitor in the timing element.

FIG. 3 shows the charging profile of capacitor $C_4$, at whose upper limiting value transistor $T_1$ is completely open, and at whose lower limiting value the blocking of transistor $T_1$ begins. As shown in FIG. 3, the charging of capacitor $C_4$ is initiated by the first-time occurrence of the detector signal. At the end of the detector signal, the operating time of timing element $C_4/R_4$ begins to lapse. After that, capacitor $C_4$ is recharged, in some instances by a reoccurrence of the detector signal. At the end of the following renewed start of the lapsing of the timing element's operating time, for example at the instant 1.5 sec. in FIG. 3, the channel separation is continually raised to the optimal value.

Figure 4:
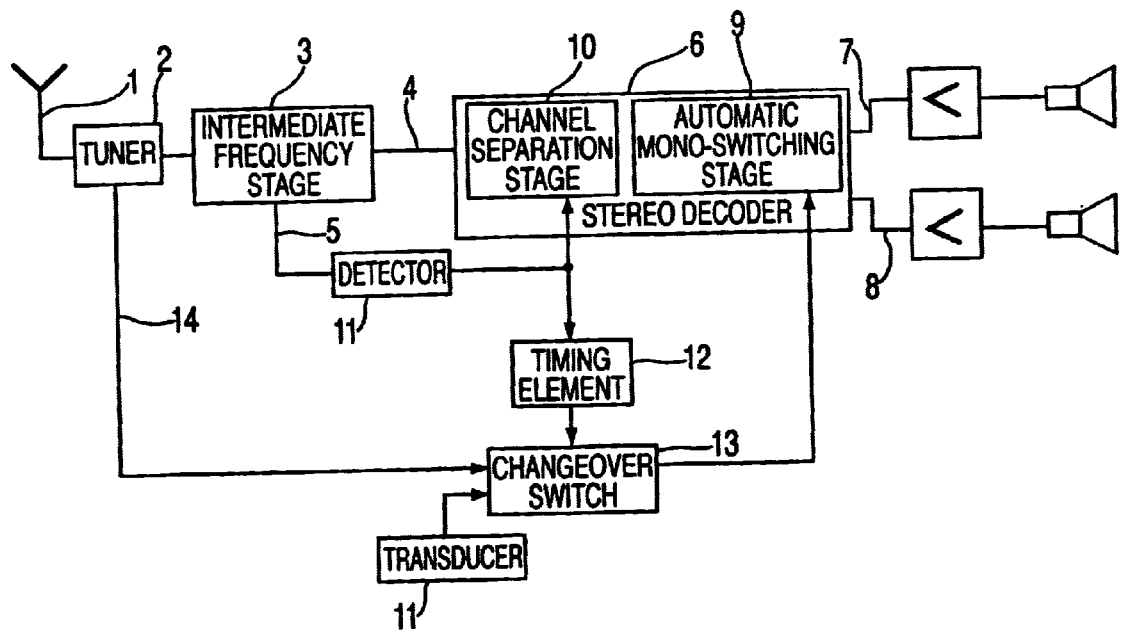
FIG. 4 shows the timing element in conjunction with a circuit for a phased mono-stereo switchover.

In the embodiment of the present invention illustrated in FIG. 4, the temporary reduction in the channel separation following a multi-path reception period is readjusted with the aid of a channel-separation stage, which controls a field-strength-dependent phased mono-stereo transition. When working with a stereo radio receiver equipped with such a circuit, in addition to the automatic mono switch-over stage 10, the timing element 12 controls a changeover switch 13, which is looped into the input of the circuit for the field-strength-controlled, phased mono-stereo transition, which is normally linked to the field-strength measuring output 14 of tuner 2. Changeover switch 13 is connected, during or following a multi-path reception situation, for the duration of the operating time of timing element 12, to a transducer 15, which simulates a fixed field strength, in response to which, for example, the phased mono-stereo transition adjusts itself to 12 dB.

According to an embodiment of the present invention a circuit for a phased mono-stereo transition, which under known methods heretofore is only adjusted dependent upon the field-strength measuring signal, is tuned for a time, even given a maximum reception field strength, to a reduced measure of the channel separation, by specifying a transducer value that simulates a lesser field strength, after one has left a multi-path reception area.

The analog modules in the above described circuits can be replaced, without difficulty, by digitally working processors, when the MPX signal is adapted to be tapped off in digital form at ZF stage 3, i.e. when the signals are present in digital form at the inputs of the two audio channels 7 and 8.

In the first case, the program of stereo processor 6 is supplemented by a program along the lines of the first embodiment, for processing the MPX signal. In the second case, the program of stereo decoder 6 is supplemented for a phased mono-stereo transition, along the lines of the second embodiment.

In both programs, after the operating time of the timing elements has elapsed, the counter content, which held the reduced (retained) degree of channel separation during the operating time of the timing elements, is incremented in the direction of (i.e., to effect) an increase in the channel separation.

What is claimed is:

1. A stereo radio receiver comprising:
    a changeover switch;
    a detector for a multi-path reception of at least one signal from a stereo radio transmitter, the detector controlling the changeover switch to switch from a stereophonic reproduction having a channel separation to a monophonic reproduction in response to the multi-path reception, the detector controlling the changeover switch for a duration of the multi-path reception;
    a channel-separation stage; and
    a timing element being switched on by the detector;
    wherein, when the timing element operates and after the multi-path reception ends, the timing element effects the stereophonic reproduction via the channel-separation stage for reducing the channel separation to a predetermined value that is smaller than a maximum value of the channel separation, wherein the timing element controls a phase shifter situated in a MPX signal path of the stereo radio receiver.

2. A stereo radio receiver comprising:

a changeover switch;

a detector for a multi-path reception of at least one signal from a stereo radio transmitter, the detector being operable to control the changeover switch to switch from a stereophonic reproduction having a channel separation to a monophonic reproduction in response to the multi-path reception, the detector being operable to control the changeover switch for a duration of the multi-path reception;

a channel-separation stage; and a timing element being switched on by the detector;

wherein, when the timing element operates and after the multi-path reception ends, the timing element is operable to effect the stereophonic reproduction via the channel-separation stage to reduce the channel separation to a predetermined value that is smaller than a maximum value of the channel separation;

a strength measuring unit being switched off by the changeover switch; and a circuit for providing a phased mono-stereo transition which is field strength dependent, the circuit including an input circuit;

wherein:

in the input circuit of the circuit for providing the phased mono-stereo transition, the timing element controls the changeover switch; and for a transition time, the changeover switch is operable to provide a fixed diminished field strength.

3. A stereo radio receiver comprising:

a changeover switch;

a detector for a multi-path reception of at least one signal from a stereo radio transmitter, the detector controlling the changeover switch to switch from a stereophonic reproduction having a channel separation to a monophonic reproduction in response to the multi-path reception, the detector controlling the changeover switch for a duration of the multi-path reception;

a channel-separation stage;

a timing element being switched on by the detector; and digitally operating signal processors positioned in signal paths and including a digital counter, the digital counter having a content for determining the channel separation;

wherein, when the timing element operates and after the multi-path reception ends, the timing element effects the stereophonic reproduction via the channel-separation stage for reducing the channel separation to a predetermined value that is smaller than a maximum value of the channel separation, wherein, when the timing element operates, the content of the digital counter is maintained at an adjustable predetermined value, and wherein, after the timing element stops operating, the content of the digital counter is continuously modified to increase the channel separation.

4. A stereo radio receiver comprising:

a changeover switch;

a detector for a multi-path reception of at least one signal from a stereo radio transmitter, the detector controlling the changeover switch to switch from a stereophonic reproduction having a channel separation to a monophonic reproduction in response to the multi-path reception, the detector controlling the changeover switch for a duration of the multi-path reception;

a channel-separation stage; and a timing element being switched on by the detector;

wherein, when the timing element operates and after the multi-path reception ends, the timing element effects the stereophonic reproduction via the channel-separation stage for reducing the channel separation to a predetermined value that is smaller than a maximum value of the channel separation, wherein, after the timing element stops operating, the timing element continuously increases the channel separation to an optimal value.

5. A stereo radio receiver comprising:

a changeover switch;

a detector for a multi-path reception of at least one signal from a stereo radio transmitter, the detector being operable to control the changeover switch to switch from a stereophonic reproduction having a channel separation to a monophonic reproduction in response to the multi-path reception, the detector being operable to control the changeover switch for a duration of the multi-path reception;

a channel-separation stage; and a timing element being switched on by the detector;

wherein, when the timing element operates and after the multi-path reception ends, the timing element is operable to effect the stereophonic reproduction via the channel-separation stage to reduce the channel separation to a predetermined value that is smaller than a maximum value of the channel separation;

wherein the timing element is operable to control a phase shifter situated in a MPX signal path of the stereo radio receiver;

wherein the channel separation stage includes a phase shifter, the phase shifter including:

a first capacitor; and a series circuit connected in parallel to the first capacitor, the series circuit including a second capacitor and a circuit closing device having a control input circuit, the control input circuit including the timing element, the timing element further including an RC combination; and the timing element receives an output signal from the detector.

6. The stereo radio receiver according to claim 2 or 5, wherein the predetermined value is 12 dB.

7. The stereo radio receiver according to claim 2 or 5, wherein the timing element controls a phase shifter situated in an MPX signal path of the stereo radio receiver.

8. The stereo radio receiver according to claim 2 or 5, further comprising:

digitally operating signal processors positioned in signal paths and including a digital counter, the digital counter having a content for determining the channel separation, wherein, when the timing element operates, the content of the digital counter is maintained at an adjustable predetermined value, and wherein, after the timing element stops operating, the content of the digital counter is continuously modified to increase the channel separation.

9. The stereo radio receiver according to claim 2 or 5, wherein, after the timing element stops operating, the timing element continuously increases the channel separation to an optimal value.

10. A stereo broadcast radio receiver comprising:
a changeover switch;
a timer; and
a detector to detect multipath reception of a stereo broadcast radio transmitter, the detector being operable to control the changeover switch to change over from stereophonic reproduction to monophonic reproduction when the multipath reception occurs;
wherein:
the changeover switch is operable to cause the monophonic reproduction only for a duration of the multipath reception; and
the timer is actuated by the detector and, after the end of the multipath reception and during its active time, uses a channel separation stage to fix a stereo channel separation to a predetermined reduced level between a minimum stereo channel separation and a maximum stereo channel separation to provide the stereophonic reproduction with reduced stereo channel separation;
another changeover switch in an input circuit of a circuit to provide the mono-stereo changeover; and
a field strength measuring arrangement to measure a field strength;
wherein:
the stereo broadcast radio receiver is operable to provide a smooth mono-stereo changeover that is a function of the field strength;
the timer is operable to control another changeover switch to switch field strength measuring arrangement off and to preset a fixed, lower field strength for a changeover time.

11. The stereo broadcast radio receiver according to claim 10, wherein the predetermined reduced level is 12 dB.

12. The stereo broadcast radio receiver according to claim 10, wherein a phase shifter switchable by the timer is in an MPX signal path of the stereo broadcast radio receiver.

13. The stereo broadcast radio receiver according to claim 12, wherein:
the phase shifter includes:
a first capacitor;
an on-switch associated with a control input circuit, and connected in a series circuit with the first capacitor;
a second capacitor connected in parallel with the series circuit;
the timer includes a resistive-capacitive circuit arrangement; and
the detector is operable to supply an output signal to the control input circuit of the on-switch.

14. A stereo broadcast radio receiver according to claim 10, further comprising:
a digital signal processor in a signal path to determine the stereo channel separation level by a digital count;
wherein the digital count is fixed at an adjustable and predetermined value during an active time of the timer, and is continuously variable to increase the stereo channel separation level during an inactive time of the timer.

15. The stereo broadcast radio receiver according to claim 10, wherein the timer is operable to continuously increase the stereo channel separation to an optimum level after an active time of the timer has elapsed.

16. The stereo broadcast radio receiver according to claim 10, wherein an active time of the timer is started again by the detector coming into action again during a first active time.

17. A stereo radio receiver comprising:
a changeover switch;
a detector for a multi-path reception of at least one signal from a stereo radio transmitter, the detector controlling the changeover switch to switch from a stereophonic reproduction having a channel separation to a monophonic reproduction in response to the multi-path reception, the detector controlling the changeover switch for a duration of the multi-path reception;
a channel-separation stage;
a timing element being switched on by the detector;
a strength measuring unit being switchable off by the changeover switch; and
a circuit to provide a phased mono-stereo transition which is field strength dependent, the circuit including an input circuit;
wherein:
in the input circuit of the circuit for providing the phased mono-stereo transition, the timing element is operable to control the changeover switch; and
for a transition time, the changeover switch is operable to provide a field strength;
when the timing element operates and after the multi-path reception ends, the timing element effects the stereophonic reproduction via the channel-separation stage for reducing the channel separation to a predetermined value that is smaller than a maximum value of the channel separation.

18. A stereo radio receiver comprising:
a changeover switch;
a detector for a multi-path reception of at least one signal from a stereo radio transmitter, the detector controlling the changeover switch to switch from a stereophonic reproduction having a channel separation to a monophonic reproduction in response to the multi-path reception, the detector controlling the changeover switch for a duration of the multi-path reception;
a channel-separation stage; and
a timing element being switched on by the detector;
wherein, when the timing element operates and after the multi-path reception ends, the timing element effects the stereophonic reproduction via the channel-separation stage for reducing the channel separation to a predetermined value that is smaller than a maximum value of the channel separation,
wherein the changeover switch is operable to provide a fixed field strength for a mono-stereo transition.

19. A stereo radio receiver comprising:
a changeover switch;
a detector for a multi-path reception of at least one signal from a stereo radio transmitter, the detector controlling the changeover switch to switch from a stereophonic reproduction having a channel separation to a monophonic reproduction in response to the multi-path reception, the detector controlling the changeover switch for a duration of the multi-path reception;
a channel-separation stage;
a timing element being switched on by the detector;
a circuit to provide a field-strength-dependent, phased mono-stereo transition, the circuit including an input circuit, wherein the changeover switch is looped into the input circuit to provide the field-strength-dependent, phased mono-stereo transition;

wherein, when the timing element operates and after the multi-path reception ends, the timing element effects the stereophonic reproduction via the channel-separation stage for reducing the channel separation to a predetermined value that is smaller than a maximum value of the channel separation.

20. The stereo receiver according to claim 19, further comprising:

a transducer to simulate a fixed field strength, wherein the changeover switch is connected, one of during and following a multi-path reception situation, to the transducer for a duration of an operating time of the timing element.

21. A stereo radio receiver comprising:

a changeover switch;

a detector for a multi-path reception of at least one signal from a stereo radio transmitter, the detector being operable to control the changeover switch to switch from a stereophonic reproduction having a channel separation to a monophonic reproduction in response to the multi-path reception, the detector being operable to control the changeover switch for a duration of the multi-path reception;

a channel-separation stage; and a timing element being switched on by the detector;

wherein, when the timing element operates and after the multi-path reception ends, the timing element is operable to effect the stereophonic reproduction via the channel-separation stage to reduce the channel separation to a predetermined value that is smaller than a maximum value of the channel separation, wherein an operation of the timing element is restarted in response to a renewed activation of the detector during a first predetermined operating time, wherein the timing element controls a phase shifter situated in an MPX signal path of the stereo radio receiver.

22. A stereo radio receiver comprising:

a changeover switch;

a detector for a multi-path reception of at least one signal from a stereo radio transmitter, the detector being operable to control the changeover switch to switch from a stereophonic reproduction having a channel separation to a monophonic reproduction in response to the multi-path reception, the detector being operable to control the changeover switch for a duration of the multi-path reception;

a channel-separation stage;

a timing element being switched on by the detector; and digitally operating signal processors positioned in signal paths and including a digital counter, the digital counter having a content for determining the channel separation;

wherein, when the timing element operates and after the multi-path reception ends, the timing element is operable to effect the stereophonic reproduction via the channel-separation stage to reduce the channel separation to a predetermined value that is smaller than a maximum value of the channel separation, wherein an operation of the timing element is restarted in response to a renewed activation of the detector during a first predetermined operating time, wherein, when the timing element operates, the content of the digital counter is maintained at an adjustable predetermined value, and wherein, after the timing element stops operating, the content of the digital counter is continuously modified to increase the channel separation.

23. A stereo radio receiver comprising:

a changeover switch;

a detector for a multi-path reception of at least one signal from a stereo radio transmitter, the detector being operable to control the changeover switch to switch from a stereophonic reproduction having a channel separation to a monophonic reproduction in response to the multi-path reception, the detector being operable to control the changeover switch for a duration of the multi-path reception;

a channel-separation stage; and a timing element being switched on by the detector;

wherein, when the timing element operates and after the multi-path reception ends, the timing element is operable to effect the stereophonic reproduction via the channel-separation stage to reduce the channel separation to a predetermined value that is smaller than a maximum value of the channel separation, wherein an operation of the timing element is restarted in response to a renewed activation of the detector during a first predetermined operating time, wherein, after the timing element stops operating, the timing element continuously increases the channel separation to an optimal value.

\* \* \* \* \*